United States Patent [19]

Megeid

[11] Patent Number: 5,351,177
[45] Date of Patent: Sep. 27, 1994

[54] SWITCH MODE POWER SUPPLY WITH STANDBY MODE OPERATION

[75] Inventor: Magdy Megeid, Zurich, Switzerland

[73] Assignee: RCA Thomson Licensing Corporation, Princeton, N.J.

[21] Appl. No.: 95,388

[22] Filed: Jul. 23, 1993

[30] Foreign Application Priority Data

Sep. 17, 1992 [GB] United Kingdom ............ 9219663.3
Dec. 18, 1992 [GB] United Kingdom ............ 9226381.3

[51] Int. Cl.$^5$ ........................................ H02M 3/335
[52] U.S. Cl. ..................... 363/21; 363/97; 315/411; 348/730
[58] Field of Search .............. 363/16, 20, 21, 25, 363/97, 131; 358/190; 315/411

[56] References Cited

U.S. PATENT DOCUMENTS

| | | | |
|---|---|---|---|
| 4,109,307 | 8/1978 | Knoll | 363/101 |
| 4,302,717 | 11/1981 | Olla | 323/282 |
| 4,315,305 | 2/1982 | Siemon | 363/88 |
| 4,459,651 | 7/1984 | Fenter | 363/21 |
| 4,564,897 | 1/1986 | Okamoto et al. | 363/132 |
| 4,680,511 | 7/1987 | Fitzgerald et al. | 315/411 |
| 4,689,730 | 8/1987 | Kimura | 363/21 |
| 4,761,723 | 8/1988 | Lendaro | 363/21 |
| 4,766,528 | 8/1988 | Marinus | 363/21 |
| 4,788,591 | 11/1988 | Decraemer | 358/190 |
| 4,930,060 | 5/1990 | Leonardi | 363/21 |
| 4,975,592 | 12/1990 | Hahn et al. | 363/21 X |
| 4,975,823 | 12/1990 | Rilly et al. | 363/56 |
| 5,010,281 | 4/1991 | Rodriguez-Cavazos | 315/411 |
| 5,017,844 | 5/1991 | Lendaro | 315/408 |
| 5,126,930 | 6/1992 | Ahn | 363/21 |
| 5,146,394 | 9/1992 | Ishii et al. | 363/16 |
| 5,161,241 | 11/1992 | Kanai | 363/65 |
| 5,189,600 | 2/1993 | Keck et al. | 358/190 X |

FOREIGN PATENT DOCUMENTS 58-141680 8/1983 Japan.

OTHER PUBLICATIONS

A publication by Siemens Semiconductor, Industrial ICs, dated Dec. 15, 1989 illustrating a switch mode power supply that includes a transistor T.
A publication entitled Power Supply Controls published by Unitrode Integrated Circuit.

*Primary Examiner*—Emanuel T. Voeltz
*Attorney, Agent, or Firm*—Joseph S. Tripoli; Joseph J. Laks; Sammy S. Hening

[57] ABSTRACT

A pulse-width modulator controls a switching transistor. The switching transistor is coupled to a primary winding of a chopper transformer. The switching transistor and the primary winding are referenced to a nonisolated ground conductor. To initiate a standby mode of operation, a first on/off control signal that is referenced to an isolated ground conductor disables a horizontal oscillator that is energized from a secondary winding of the chopper transformer and that is also referenced to the isolated ground conductor. As a result, a decrease loading of circuit elements that are referenced to the isolated ground occurs. In the standby mode, current pulses in the primary winding are produced at a substantially higher frequency than in normal operation. A frequency detector referenced to the nonisolated ground generates a second on/off control signal that is referenced to the nonisolated ground in accordance with the frequency of the current pulses in the chopper transformer. In this way, the second on/off control signal is generated without the need for an additional isolation element other than the chopper transformer.

7 Claims, 5 Drawing Sheets

SWITCH MODE POWER SUPPLY WITH STANDBY MODE OPERATION

The invention relates to a switch mode power supply (SMPS). In particular, the invention relates to a SMPS that derives a rectified input supply voltage from an AC, mains supply voltage to produce an output supply voltage.

Some television receivers have signal terminals for receiving, for example, external video input signals such as R, G and B input signals, that are to be developed relative to the common conductor of the receiver. Such signal terminals and the receiver common conductor may be coupled to corresponding signal terminals and common conductors of external devices, such as, for example, a VCR or a teletext decoder.

To simplify the coupling of signals between the external devices and the television receiver, the common conductors of the receiver and of the external devices are connected together so that all are at the same potential. The signal lines of the external devices are coupled to the corresponding signal terminals of the receiver. In such an arrangement, the common conductor of each device, such as the television receiver, may be held "floating", or conductively isolated, relative to the corresponding AC mains supply source that energizes the device. When the common conductor is held floating, a user touching a terminal that is at the potential of the common conductor will not suffer an electrical shock. Such electrical shock may occur if the common conductor is not held floating. Furthermore, having the common conductor floating avoids an undesirable current flow, or a current loop, among the common conductors that are, as described above, connected together.

Therefore, it may be desirable to isolate the common conductor, or ground, of, for example, the television receiver from the potentials at the terminals of the AC mains supply source that provides power to the receiver. Such isolation is typically achieved by a transformer, as described below. The isolated common conductor is sometimes referred to as "cold" ground conductor.

In some television receivers the AC mains supply voltage is coupled directly to a bridge rectifier for producing an unregulated direct current (DC) input voltage. The unregulated DC input voltage is applied to a SMPS having a chopper transformer that generates regulated DC voltages. The regulated DC voltages are, typically, developed from a secondary winding of the chopper transformer, relative to the cold ground conductor. The chopper transformer conductively isolates the regulated voltages, thus causing them to be floating, relative to the potentials at terminals of the AC mains supply voltage source.

Circuit networks of the power supply that provide voltages that are not floating relative to the potentials at the AC mains supply voltage source terminals, such as voltages at the primary winding of the chopper transformer, are referenced to a common conductor that is, therefore, floating relative to the cold ground conductor and that is sometimes referred to as "hot" ground conductor.

In some television receivers, a remote control unit generates a first on/off control signal that is referenced to the "cold" ground conductor. The first on/off control signal, for example, disables a horizontal oscillator, thereby initiating a standby mode of operation. As a result, a decrease loading of circuit elements that are referenced to the "cold" ground occurs. A pulse-width modulator (PWM) controls a switching transistor of the SMPS. The switching transistor is coupled to the primary winding of the chopper transformer. The PWM, the switching transistor and the primary winding are referenced to the "hot" ground. It may be desirable to generate a second on/off control signal that is referenced to the "hot" ground via the chopper transformer to provide the required isolation between the first and second on/off control signals.

An SMPS, embodying an aspect of the invention, produces in the standby mode, current pulses in the primary winding at a substantially higher frequency than in normal operation. A frequency detector referenced to the "cold" ground generates the second on/off control signal in accordance with the frequency of the current pulses in the chopper transformer. In this way, the second on/off control signal is generated without the need for an additional isolation element other than the chopper transformer.

A switch mode power supply, embodying an aspect of the invention, includes a source of an AC, mains supply voltage and a load circuit. A regulating power stage is coupled to the source and responsive to a pulse-width modulated, switching signal for generating an output supply voltage, during both power-on and standby operations and for regulating in a feedback manner the output supply voltage developed in the load circuit during the power-on operation. A source of a first on/off control signal that is coupled to the load circuit significantly reduces an output supply current of the power supply in the load circuit when the on/off control signal is indicative of the standby operation. A feedback signal that is indicative of a magnitude of at least one of the output supply voltage and the output supply current is generated. A modulator is responsive to the feedback signal for generating the switching signal, during both the power-on and standby operations. The switching signal is modulated in accordance with the feedback signal such that, in the standby operation, an interval between transition edges of the switching signal is substantially different than in the power-on operation. A detector is responsive to the switching signal for generating a second on/off control signal in accordance with the interval between the transition edges of the switching signal.

Figure 1:
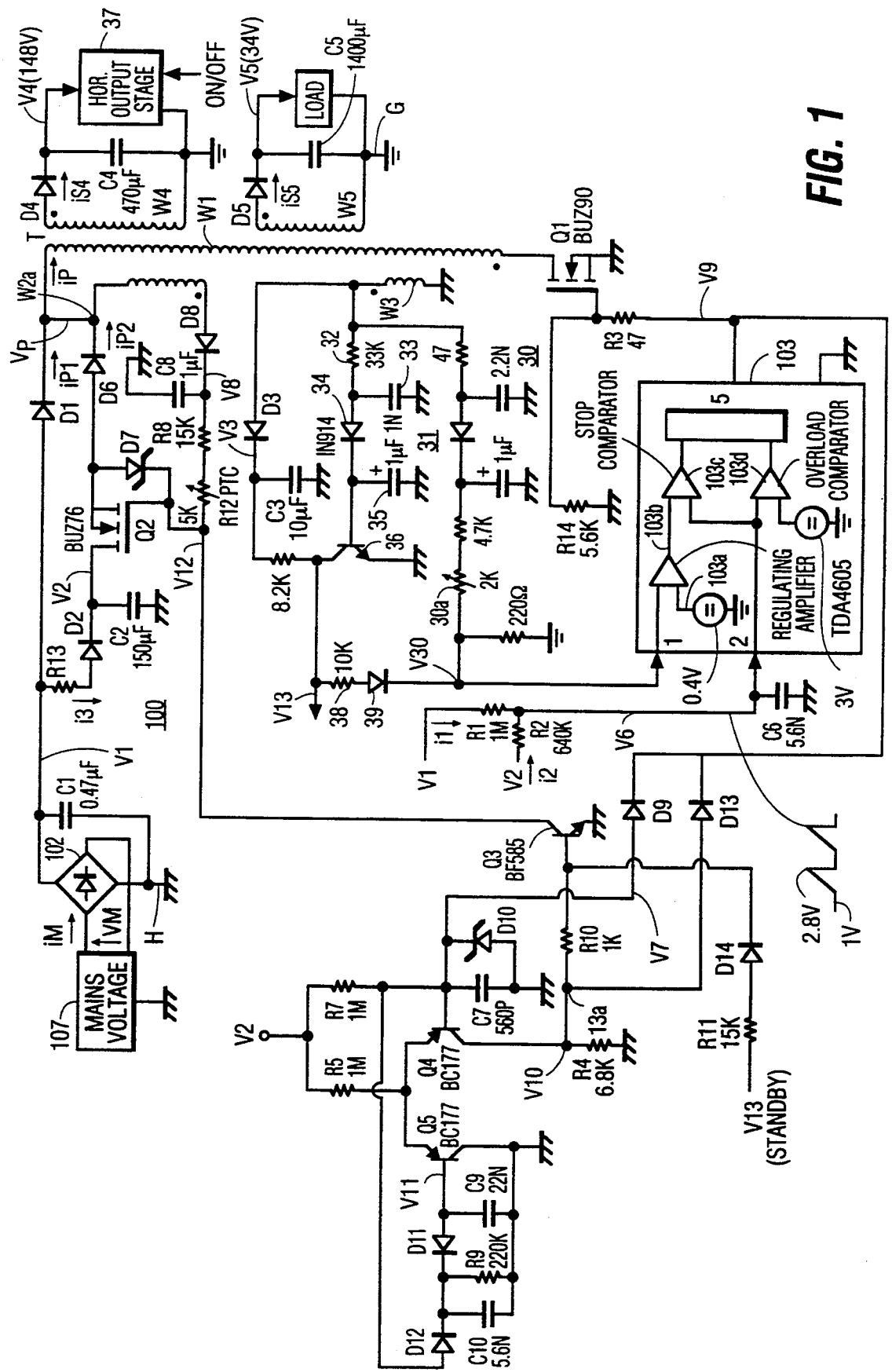
FIG. 1 illustrates an SMPS, embodying an aspect of the invention, that utilizes a current super-position technique.

FIG. 1 illustrates an SMPS 100, embodying an aspect of the invention, that utilizes a technique, referred to herein as current super-position technique. SMPS 100 of FIG. 1 is suitable for providing, for example, 120 watts power. A mains supply voltage source 107 that produces an AC voltage VM is coupled to a full-wave bridge rectifier 102 that produces an AC full-wave rectified input supply voltage V1 in a relatively small filter capacitor C1. AC voltage VM of source 107 is sinusoidal at, for example, a line frequency of 50 Hz. Because of the small capacitance of capacitor C1, low frequency harmonics of voltage V1 are not filtered out by capacitor C1. Voltage V1, having a waveform of an unfiltered, full wave rectified sinusoidal voltage, is coupled via a switching diode D1 to an end terminal W2a of a primary winding W1 of a flyback transformer T.

A switching signal V9, having a controllable frequency and duty cycle, is coupled via a resistor R3 to a resistor R14 and to a gate of an MOS switching transistor Q1 to turn on transistor Q1 only when signal V9 is at a HIGH level or 12 volts. The drain electrode of transistor Q1 is coupled to the other end terminal of winding W1. Signal V9 is developed at an output terminal of an integrated circuit (IC) 103 of the type TDA4605 operating as a pulse-width modulator. The frequency of signal V9 is selected to be within a range of 20–50 KHz.

In a given cycle of signal V9, after signal V9 attains the HIGH level, a pulse current ip1 flows through diode D1. An upramping current ip that is equal to current ip1 in diode D1 is produced in winding W1, storing magnetic energy in transformer T. Immediately after signal V9 changes from the HIGH to a LOW level, transistor Q1 becomes non-conductive and a flyback operation occurs. The result is that flyback pulse currents are produced in secondary windings W2, W3, W4 and W5 of transformer T. The drain voltage of transistor Q1 is limited, during flyback, by means of a snubber circuit, not shown.

As a result of flyback current pulses, such as a current pulse is4 in winding W4, that are produced from pulses ip, DC output supply voltages V3, V4, V5 and V8 are produced in capacitors C3, C4, C5 and C8 via rectifying diodes D3, D4, D5 and DS, respectively. Voltage V4 energizes, for example, a horizontal deflection output stage 37 and voltage V5 energizes, for example, an audio stage of a television receiver.

Transformer T isolates, with respect to electrical shock hazard, source 107 and a "hot" ground conductor, H, from a "cold" ground conductor G. Voltages V3 and V8 are referenced to hot ground conductor H. Whereas, voltages V4 and V5 are referenced to cold ground conductor G.

In normal operation, a DC sense voltage V30 that is indicative of, for example, voltage V4 is produced in a circuit 30 by filtering and rectifying the flyback pulses in winding W3 and voltage dividing. A resistor 30a is adjustable for adjusting the output supply voltages by the adjustment of voltage V30. Sense voltage V30 is applied to a sense input terminal, pin 1, of IC 103. Voltage V30 is compared in IC 103 with a reference voltage 103a. An error voltage 103b is produced from a difference between voltage V30 and reference voltage 103a. Error voltage 103b is coupled to an input of a stop comparator 103c to control a pulse-width or a HIGH-to-LOW transition of signal V9 to regulate the levels of output voltages V4 and V5.

Voltage V1 is also coupled via a series arrangement of a resistor R13 and a rectifying diode D2 to a filter capacitor C2 for producing a supply voltage V2 in capacitor C2. Voltage V2 is a constant, DC voltage that is proportional to the peak voltage of voltage V1. Voltage V2 is coupled via an MOS switching transistor Q2 and a switching diode D6, when transistor Q2 is conductive, to junction terminal W2a. Terminal W2a is coupled between diode D1 of winding W1 and a secondary winding W2 of transformer T.

DC voltage V8 developed, during flyback, via winding W2 is larger by about 15V than voltage V2. Voltage V8 is coupled to the gate of transistor Q2 via a resistor R8 and a resistor R12. coupled in series, to turn on switching transistor Q2 when a transistor Q3 that is coupled to the gate of transistor Q2 is turned off. By being larger than voltage V2, voltage V8 is sufficient to turn on MOS transistor Q2. A protection diode D7 coupled between the source electrode and gate electrode of transistor Q2 limits gate-source voltage excursions of transistor Q2.

Signal V9 of FIG. 1 also controls the switching operation frequency of transistor Q2. To control the switching operation of transistor Q2, signal V9 of FIG. 1 is coupled via a diode D9 to a ramp generator that is formed by a resistor R7 and a capacitor C7. A zener diode D10 limits the maximum voltage of a ramp signal V7 in capacitor C7 to 9.1 volt. When signal V9 is HIGH, diode D9 is reverse biased and capacitor C7 is charged by means of voltage V2 through resistor R7. Consequently, signal V7 in capacitor C7 increases linearly. When signal V9 becomes LOW, diode D9 conducts and capacitor C7 is immediately discharged through the low impedance output formed at pin 5 of IC 103.

FIGS. 2a–2h illustrate waveforms useful for explaining the operation of the circuit of FIG. 1. Similar symbols and numerals in FIGS. 1 and 2a–2h indicate similar items or functions.

Figure 2A:
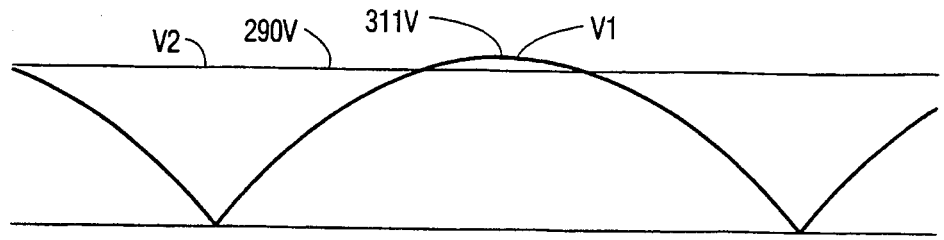
FIGS. 2a–2h illustrate waveforms useful for explaining the operation of the SMPS of FIG. 1.
Figure 2B:

The pulse width of signal V9 of FIG. 1 determines the peak level of signal V7 that is developed in capacitor C7. Because the voltage that is coupled via diode D1 to winding W1 has a full wave rectified sinusoid waveform, the feedback signal to IC 103 causes the pulse width of signal V9 to vary as a function of full wave rectified voltage V1. Consequently, the peaks or envelope of signal V7 also varies as a function of voltage V1, during the 10 millisecond period of voltage V1, as shown in FIG. 2d. In FIG. 2d, for example, the ratio between the period of signal V7 and that of voltage V1 of FIG. 2a is exaggerated for better clarity.

Signal V7 of FIG. 1 is applied to an inverting input terminal of a comparator formed by a transistor Q4 and a transistor Q5. A resistor R5 produces emitter currents in transistors Q4 and Q5. A collector resistor R4 of transistor Q4 develops an output signal V10 at an output terminal 13a of the comparator.

Output signal V10 is coupled to the base of transistor Q3 to control switching operation of transistor Q3. The collector of transistor Q3 is coupled to a load arrangement formed by resistors R8 and R12 and energized by supply voltage V8 to develop a switching signal V12 at the gate of transistor Q2.

Immediately after the transition to the HIGH level of signal V9, diode D1 becomes conductive and current ip1 is generated. As long as transistor Q2 remains turned off, current ip2 is not generated. Transistor Q2 remains nonconductive as long as output signal V10 of the comparator is HIGH in a manner to turn on transistor Q3 and, thereby, to turn off transistor Q2. Each of primary current ip1 and signal V7 increases in an upramping manner after signal V9 becomes HIGH.

Figure 2C:
Figure 2D:
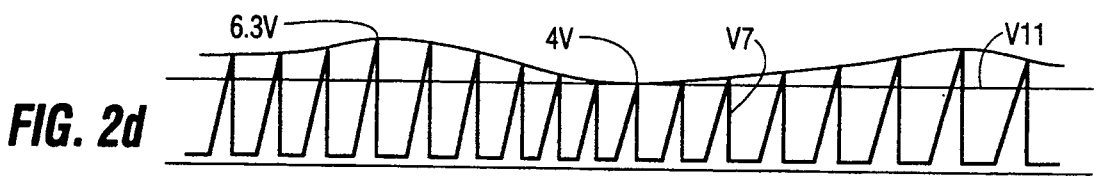
Figure 2E:
Figure 2F:
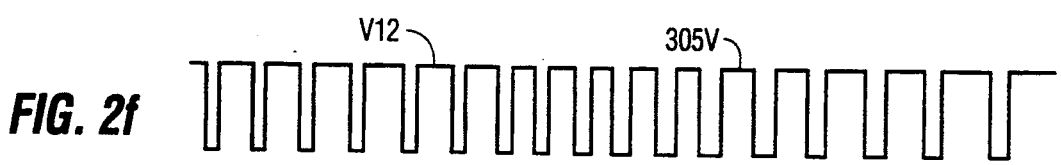

During a given switching period of signal V9, when signal V7 of FIG. 2d reaches a higher level than a threshold voltage V11 of the comparator, comparator output signal V10 of FIG. 2e changes from the HIGH to the LOW level. When signal V10 attains the LOW level, transistor Q3 of FIG. 1 is turned off and transistor Q2 is turned on by means of signal V12 of FIG. 2f.

Figure 2G:
Figure 2H:
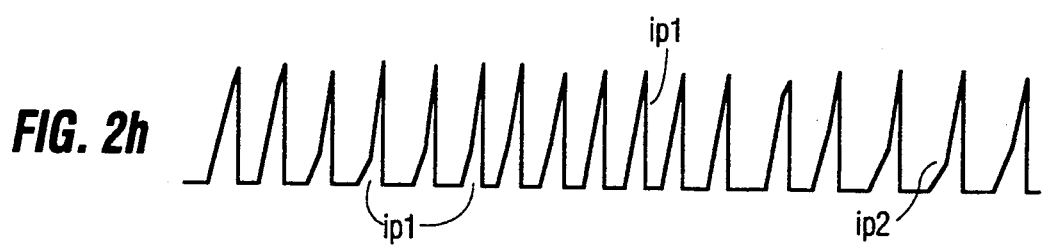

When transistor Q2 becomes conductive, diode D6 of FIG. 1 becomes conductive causing diode D1 to become nonconductive. Therefore, input supply voltage V1 is decoupled from winding W1 and voltage V2 is coupled to winding W1 via transistor Q2. Primary current ip2 of FIG. 2g in diode D6 of FIG. 1 causes current ip to continue flowing without a gap of in time from the time the pulse of current ip1 ceases, as shown in FIGS. 2g and 2h.

After a predetermined interval that is determined in accordance with voltage V30 by IC 103 of FIG. 1, signal V9 changes again to the LOW level that causes signal V7 to become LOW. Signal V9 is also coupled via a diode D13 to junction terminal 13a between resistor R4 and resistor R10. Diode D13 conduct when signal V9 is at the LOW level. Immediately after signal V9 becomes LOW, signal V10 of FIG. 2e is forced to be LOW because diode D13 of FIG. 1 conducts. Therefore, transistors Q1 and Q3 are turned off. Transistor Q2 does not conduct current although signal V12 at the collector of transistor Q3 is HIGH because transistor Q1 is turned off. Advantageously, because of the operation of diode D13, no current flows in resistors R8 and R12 when signal V9 is LOW. The resulting reduction in power dissipation is about 2,5 watts at 120 watts input power. Diodes D9 and D13 are turned off when signal V9 becomes HIGH and a new cycle begins.

Figure 3A:
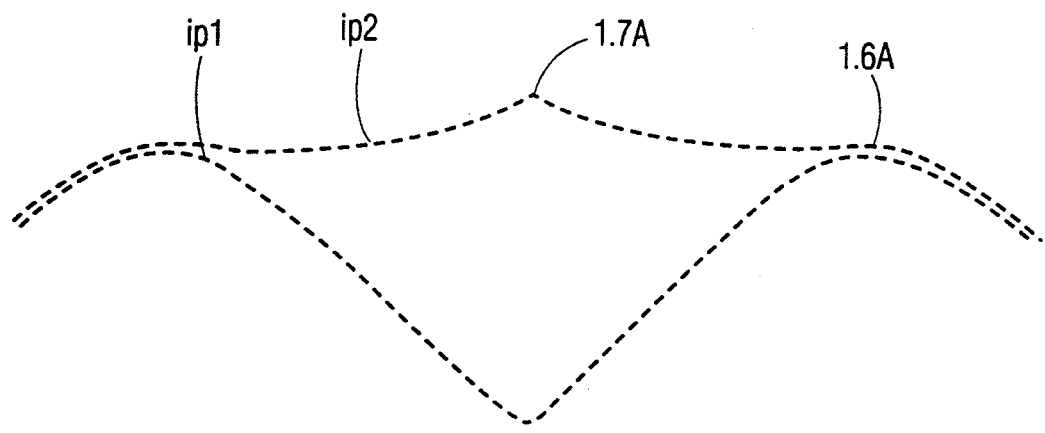
FIGS. 3a–3c illustrate additional waveforms useful for explaining the operation of the SMPS of FIG. 1.
Figure 3B:
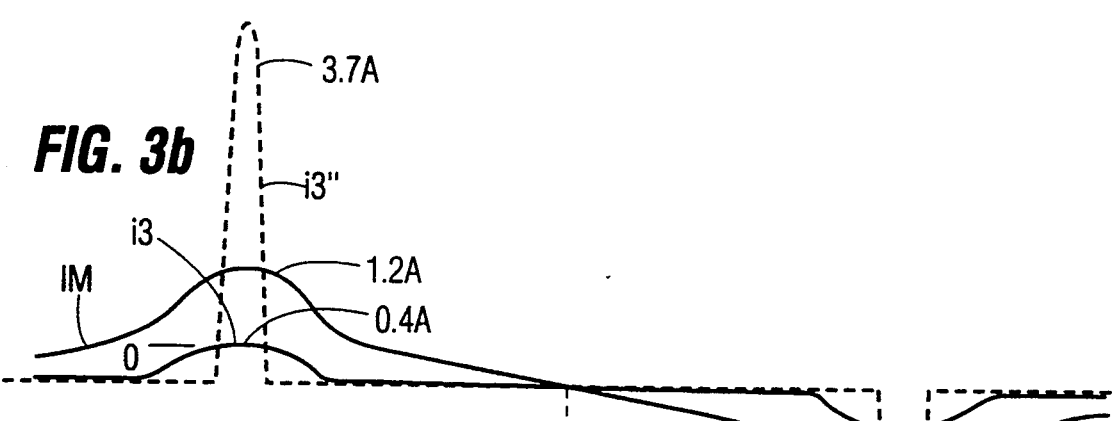
Figure 3C:
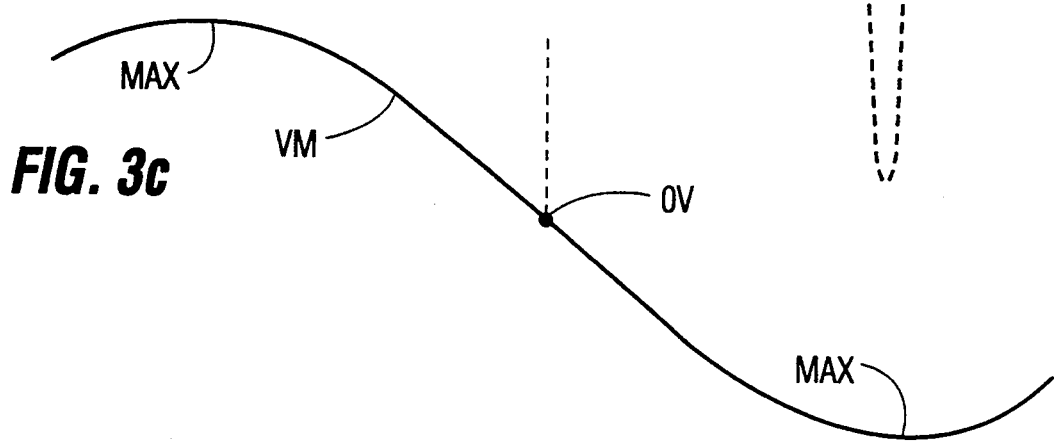

Primary current ip that is determined by the superposition of currents ip1 and ip2 is shown in FIG. 3a for a 100 watts input power. A resulting mains current iM has a waveform that is shown in FIG. 3b as a solid line. For comparison purposes, the broken line waveform in FIG. 3b corresponds to mains current iM" of a conventional power supply that includes a large filter capacitance at the output of the bridge rectifier for the same input power rate of a 100 watts. In each half-period of voltage VM, the peaks of the pulses of current ip1 vary predominantly in a sinusoidal manner at the fundamental mains frequency. Capacitor C2 is charged via resistor R13 only in the vicinity of the peaks of mains voltage VM.

Resistor R 13 causes an increase in the conduction interval of the diodes of bridge rectifier 102; thereby, resistor R13 reduces the rate of change and peak amplitude of charging current i3, as illustrated in FIG. 3b. Thus, advantageously, high harmonics content of current iM such as at the 3rd, 5th, 7th, 9th and 11th harmonics is reduced. The peak value of the pulses of current i3 is low, because the energy stored in capacitor C2 supplies only a portion of primary current ip. About 65% of the power consumption is obtained by means of current ip1 and 35% by means of current ip2.

Threshold voltage V11 controls the ratio between the pulse-width of the pulse of current ip2 and that of the pulse of current ip1. Because of a ripple voltage contained in voltage V30 during a given period of full wave rectified voltage V1, each of the pulse-width of pulse-width modulated signal V9 and the peak of signal V7 is approximately at a maximum when voltage V1 is zero and at a minimum when voltage V1 is at a maximum. To establish threshold voltage V11 for the comparator formed by transistors Q4 and Q5, signal V7 is coupled via a diode D12 to a parallel arrangement of a resistor R9 and a capacitor C10. A voltage developed in capacitor C10 varies in accordance with the low frequency envelope of the peaks of signal V7; whereas, the high frequency component is filtered out. The voltage in capacitor C10 is coupled via a diode D11 to a capacitor C9 and to a base electrode of transistor Q5. Diode D11 and capacitor C9 operate as a minimum level detector for detecting the minimum value of the envelope of the peaks of signal V7. A forward voltage in diode D12 is temperature compensated by the opposite forward voltage developed in diode D11. The envelope of the peaks of signal V7 varies as a function of voltage V1. Slice level or threshold voltage V11 that is developed in capacitor C9 is determined by the minimum pulse-width of signal V9 within a period of voltage V1. Voltage V11 is applied to the noninverting input of the comparator formed by transistors Q4 and Q5.

For constant loading, the level of voltage V11 is relatively constant. Therefore, the pulse-width of each of the pulses of current ip1 is the same. Whereas, advantageously, the pulse-width of the pulses of current ip2 varies from a maximum, when voltage V1 is zero, to a minimum, when voltage V1 is at a peak.

Increased loading, for example, causes, in each period of signal V9, an increase in the pulse-width of signal V9. Thus, the minimum pulse-width of signal V9 also increases that tends to cause an increase in voltage V11. The increase in voltage V11 tends to delay the instant, during each pulse of signal V9, when signal V10 becomes LOW, and, therefore, when transistor Q2 becomes conductive. The result is an increase in the pulse-width of the pulse of current ip1. Since the pulse-width of signal V9 also increases, a ratio between the length of the conduction interval of transistor Q2 and that of transistor Q1 tends to vary less than if, for example, voltage V11 were a constant voltage. Therefore, advantageously, the ripple voltage of output voltage V4 is less affected by loading variations than if voltage V11 were constant. It follows that the ratio between current i3 and ip1 varies less by loading. Therefore, the harmonic content of current iM or the power factor is also less affected by loading.

At a predetermined increased loading condition, the peak value of current i2 is limited. A further increased loading causes also the peak value of current i1 to be limited. An even further increased loading, such as a short circuit in the secondary side, results in a burst mode operation in IC 103.

In each cycle of signal V9, when signal V9 of FIG. 2c attains the HIGH level, capacitor C6 of FIG. 1 at pin 2 of IC 103 is charged by a current that is equal to a sum of a constant current i2, developed via a resistor R2 from voltage V2, and a current i1, having a full wave rectified sinusoid waveform. developed via a resistor R1 from voltage V1. When signal V9 of FIG. 2c is at the LOW level, voltage V6 of FIG. 2b is clamped to 1 volt, as determined by IC 103 of FIG. 1. When signal V9 of FIG. 2c attains the HIGH level, capacitor C6 of FIG. 1 develops ramping voltage V6, as shown in FIG. 2b. Because capacitor C6 is charged by means of current i1 from full wave rectified voltage V1, current i1 has a similar waveform as that of voltage V1. In IC 103, voltage V6 is coupled to an input of an over-load comparator 103d. When, under over-load condition, voltage V6 is sufficiently large to trigger comparator 103d, a HIGH-to-LOW transition occurs in signal V9. Thus, voltage V6 determines the maximum pulse-width of signal V9 that can be produced under the over-load condition. It follows that voltage V6 determines the maximum power that can be provided by SMPS 100.

The rate of change or peak level of voltage V6 varies during the period of voltage V1 such that when voltage V1 is at a minimum, the upper limit of the pulse-width of signal V9, before an over-load condition occurs, is larger than when voltage V1 is at a maximum. In this way, for a given upper limit of the pulse width of signal V9, occurring at the peak of voltage V1, an even larger pulse-width of the pulse of signal V9 and, therefore, a larger regulation range is obtained remote from the peak of voltage V1.

In IC 103, voltage V6 is coupled to an input of stop comparator 103c. In normal operation, voltage V6, in addition to voltage V30, controls the pulse-width of signal V9. The result is that when voltage V1 is at its peak, voltage V6 causes the pulse-width of signal V9 to be smaller than when voltage V1 is smaller than the peak. In this way, the pulse-width of signal V9 is modulated in a feed-forward manner via voltage V6. Advantageously, the feed-forward manner results in a reduction of the ripple voltage in output voltages V4, V5, V8 and V3.

When SMPS 100 is used in a television receiver, a signal ON/OFF determines when the television receiver is required to operate in a standby mode of operation and when in normal operation mode. The magnitudes of the load coupled to winding W4 and energized by SMPS 100 is determined by on/off control signal ON/OFF, that is produced in, for example, a microprocessor, not shown. Signal ON/OFF is referenced to the cold ground conductor G.

Detection of the standby mode of operation, activated by signal ON/OFF, is performed by a detector 31, embodying an inventive feature, that produces an on/off control signal V13 referenced to hot ground conductor H. In the standby mode of operation, the magnitude of the load coupled to windings W4 and W5 is substantially smaller than in normal operation. Because of decreased loading, an increase in sense voltage V30 tends to occur in the standby mode. In IC 103 the frequency of signal V9 increases to the resonance frequency of flyback transformer T, around 100 KHz when voltage V30 increases.

In accordance with an aspect of the invention, detector 31 is responsive to the pulses in winding W3 that are determined by signal V9 and detects the magnitude of the loads coupled to windings W4 and W5 in accordance with the frequency of the pulses in winding W3. The pulses in winding W3 are coupled, in detector 31, via a low pass filter that is formed by a resistor 32 and a capacitor 33, to a rectifier 34. Thus, rectifier 34 produces in a capacitor 35 a DC voltage representative of the length of the interval between transition edges of the pulses in winding W3.

In the standby mode of operation, winding W3 supplies an almost sinusoidal voltage at 100 KHz. This voltage is attenuated by the low pass filter formed by resistor 32 and capacitor 33. Therefore, the voltage in capacitor 35 becomes insufficiently small to turn-on an output transistor 36 of detector 31. The result is that signal V13 is at the HIGH level. On the other hand, in the normal mode of operation, the frequency is lower and transistor 36 is maintained continuously conductive and signal V13 is at the LOW level. In this way, frequency detector 31 produces signal V13 referenced to hot ground H that is indicative of standby/normal mode of operation.

Signal V13 is coupled via a diode D14 to the base of transistor Q3. Signal V13 causes transistor Q3 to conduct regardless of the level of signal V9. Therefore, transistor Q2 is turned off, during standby, and current ip2 is zero. In this case. DC current flows through resistors R8 and R12 and via transistor Q3 to ground. Resistor R 12 that is a positive temperature coefficient resistor heats and increases considerably in value. Thus, the losses in resistor R8 are further decreased, during standby. The overall circuit dissipation is further reduced because transistor Q2 is always turned off, during standby. Using this technique has two advantages. Firstly, standby input power is reduced from 14 watts to 10 watts. Secondly, during Standby, the harmonics are significantly reduced because there is only current ip1 current component.

During the standby mode of operation, voltages V3, V4 and V5 are also regulated. However, because of leakage inductance, the ratio between sense voltage V30 and output voltage V4 is such that voltage V4 tends to be larger, in standby, than in normal mode of operation. Such increase in voltage V4 that energizes output stage 37 may be undesirable because of increased component stress.

On/off control signal V13 is coupled via a series arrangement of a resistor 38 and a diode 39 to the sense input terminal, pin 1, of IC 103 for increasing the level of sense voltage V30. As a result, the duty cycle of signal V9 decreases. Consequently, advantageously, voltage V4 is decreased relative to what it would have been without the effect of the signal that is coupled via diode 39. For example, the value of circuit components can be selected in such a way that voltage V4 becomes, in standby, even smaller than in normal mode of operation.

Figure 4:
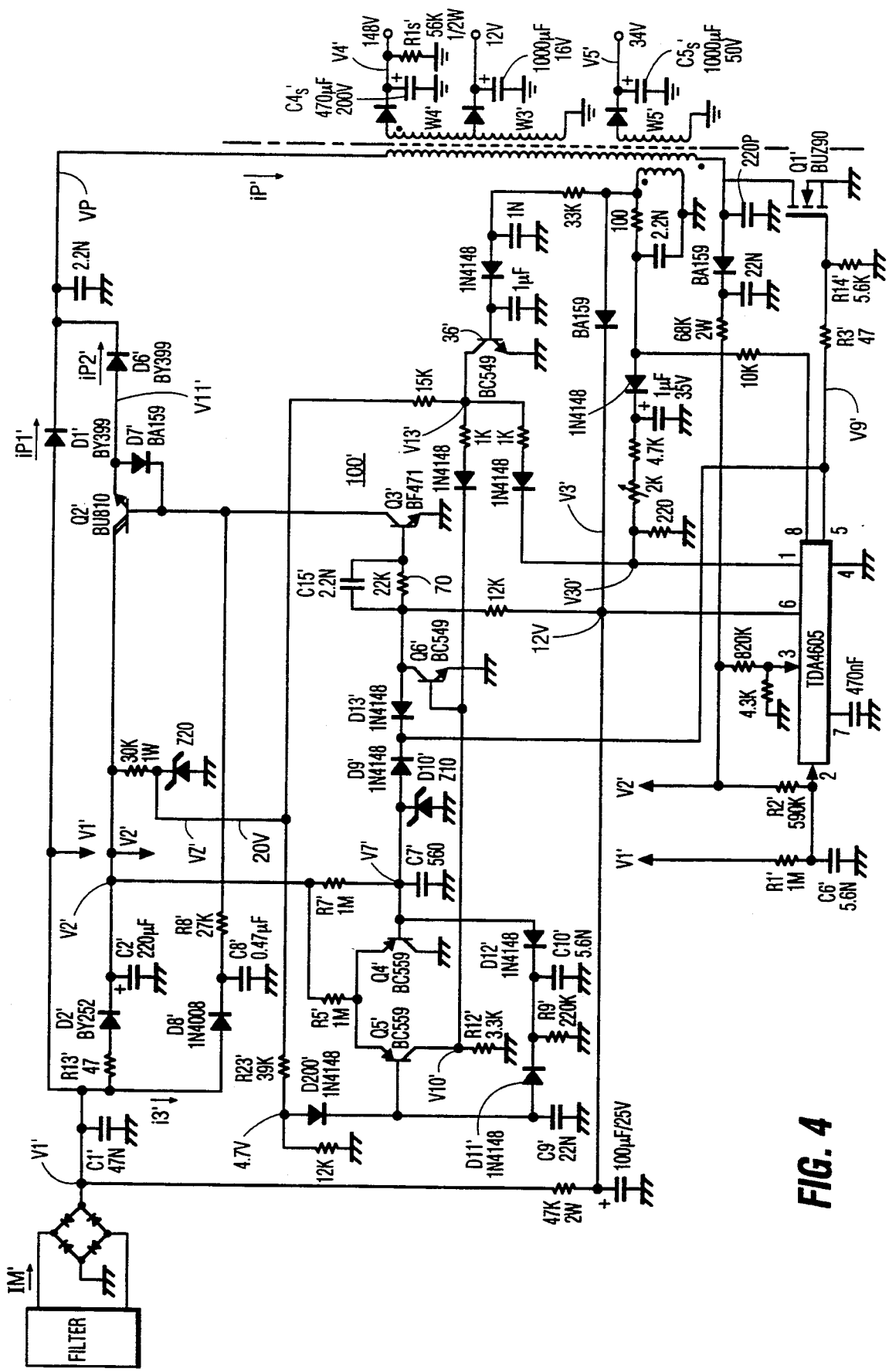
FIG. 4 illustrates a second embodiment of the invention.
Figure 5A:
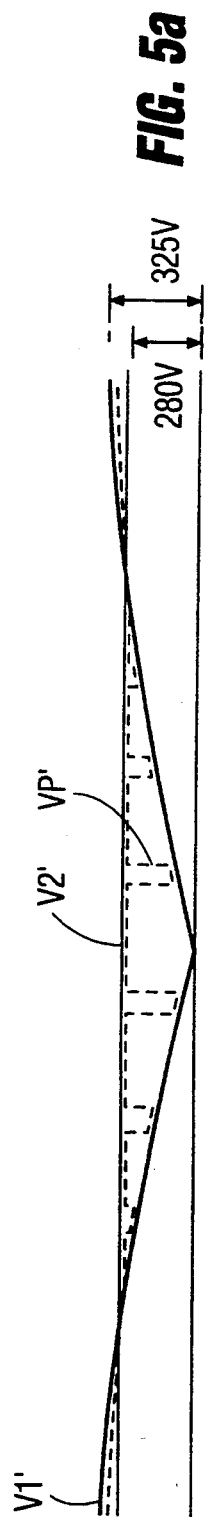
FIGS. 5a–5e illustrate waveforms useful for explaining the operation of the arrangement of FIG. 4.
Figure 5B:
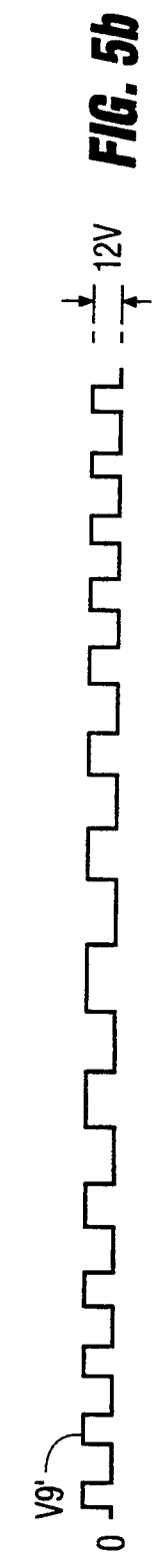
Figure 5C:
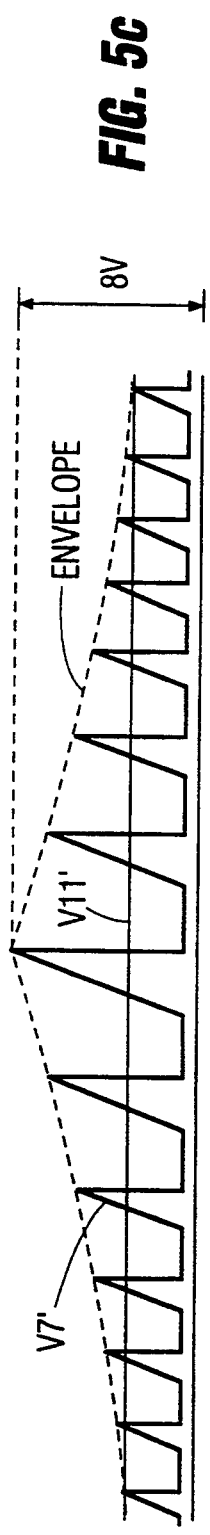
Figure 5D:
Figure 5E:
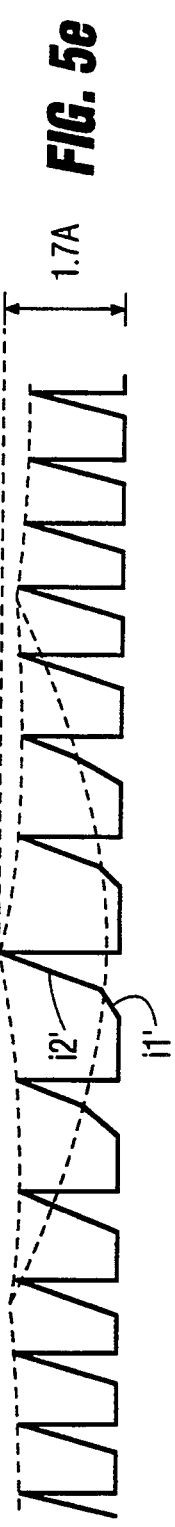

FIG. 4 illustrates a second embodiment of the invention that is similar to that of FIG. 1 with the differences noted below. FIGS. 5a–5e illustrate waveforms useful for explaining the operation the circuit of FIG. 4. Similar symbols and numerals in FIGS. 1, 2a–2h, 3a–3c, 4 and 5a–5e indicate similar items or functions except that the symbol prime (') is added in FIG. 4 for the corresponding element. In SMPS 100' of FIG. 4, transistor Q2' is a bipolar transistor. The base current for transistor Q2' is supplied via a half-wave rectifier diode D8' and a base resistor R8'. Signal V10' is derived from the collector of transistor Q5' and coupled to the base of transistor Q3' via an inverter stage formed by a transistor Q6'. The collector voltage of transistor Q6' is relatively large when turn on of transistor Q3 is required. Therefore, a base resistor 70' may be a relatively large resistor. Advantageously, because resistor 70' may be large, the circuit is less sensitive to tolerances in the level of signal V9' when signal V9' is at the LOW level and transistor Q3' is required to be turned off.

Increased loading causes a larger voltage drop across resistor R13'. Therefore, the base voltage of transistor Q2' also decreases when transistor Q2' is turned on. Advantageously, the base current also increases because of the decrease in the base voltage. The increase in the base current is desirable for maintaining transistor Q2' in saturation when its collector current increases. Signal V13' is coupled to the base of transistor Q6' to turn on transistor Q6' in the standby mode.

When a short circuit condition occurs in the load, not shown, the voltage across winding W3' is zero. Therefore, transistor 36' is turned off. The result is an increase in voltage V30' that tends to decrease the duty cycle of signal V9' so as to provide short circuit protection.

When loading of the power supply becomes smaller than a predetermined value, for example, 80 watts, a diode 200' that is coupled to the base of transistor Q5' clamps the base voltage of transistor Q5' to 4 volts. Thus, the base voltage of transistor Q5' cannot decrease below that level. Therefore, diode 200' establishes a maximum value for the conduction interval or maximum duty cycle of transistor Q2' at low loading. Thus, advantageously, the power factor that is determined by current i3' does not decrease when the loading further decreases. By providing upper limit to the duty cycle of transistor Q2', the value of resistor R13' can be smaller than if the maximum duty cycle of transistor QT could further increase when the load decreases. Therefore, advantageously, the power dissipation in resistor R13' can be made lower than if the clamping operation of diode 200' were not employed. Advantageously, the duty cycle upper limitation of transistor Q2' does not cause an increase in a ripple voltage at the output of the power supply because filter capacitors at the output of the power supply, are sufficiently large to reduce ripple at low loading.

What is claimed is:

1. A switch mode power supply, comprising:
   a source of an AC, mains supply voltage;
   a load circuit;
   a regulating power stage coupled to said source and responsive to a pulse-width modulated, switching signal for generating an output supply voltage, during both power-on and standby operations and for regulating in a feedback manner said output supply voltage developed in said load circuit during said power-on operation;
   a source of a first on/off control signal that is coupled to said load circuit for significantly reducing an output supply current of said power supply in said load circuit when said on/off control signal is indicative of said standby operation;
   means coupled to said load circuit for generating a feedback signal that is indicative of a magnitude of at least one of said output supply voltage and said output supply current;
   a modulator responsive to said feedback signal for generating said switching signal, during both said power-on and standby operations, that is modulated in accordance with said feedback signal such that, in said standby operation, an interval between transition edges of said switching signal is substantially different than in said power-on operation; and
   a detector responsive to said switching signal for generating a second on/off control signal in accordance with said interval between the transition edges of said switching signal.

2. An apparatus according to claim 1 wherein said second on/off control signal is coupled to said regulating power stage for controlling said power stage when said first on/off control signal is indicative of said standby operation.

3. An apparatus according to claim 1 wherein said detector generates said second on/off control signal in accordance with a frequency of said switching signal.

4. An apparatus according to claim 1 wherein said first on/off control signal is nonisolated from said output supply current and is isolated from said second on/off control signal and wherein said feedback signal is coupled across an isolation barrier to said modulator.

5. An apparatus according to claim 1 wherein said modulator generates said switching signal at a substantially higher frequency in said standby operation such that a period of said switching signal is substantially shorter than in said power-on operation.

6. An apparatus according to claim 1 wherein said detector comprises a filter responsive to said switching signal and a rectifier coupled to an output of said filter for generating said second on/off control signal at an output of said detector.

7. An apparatus according to claim 6 wherein said filter comprises a low-pass filter.

* * * * *